(12) United States Patent
Matthew et al.

(10) Patent No.: US 10,379,831 B2
(45) Date of Patent: *Aug. 13, 2019

(54) DYNAMIC RETRIEVAL OF INSTALLATION PACKAGES WHEN INSTALLING SOFTWARE

(71) Applicant: Apple Inc., Cupertino, CA (US)

(72) Inventors: Jack Matthew, San Francisco, CA (US); John R. Chang, Stockholm (SE)

(73) Assignee: Apple Inc., Cupertino, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/288,102

(22) Filed: Oct. 7, 2016

(65) Prior Publication Data

US 2017/0075672 A1 Mar. 16, 2017

Related U.S. Application Data

(63) Continuation of application No. 14/178,091, filed on Feb. 11, 2014, now Pat. No. 9,465,600, which is a (Continued)

(51) Int. Cl.
*G06F 8/61* (2018.01)
*H04L 29/08* (2006.01)
(Continued)

(52) U.S. Cl.
CPC ............... *G06F 8/61* (2013.01); *B32B 7/02* (2013.01); *B32B 27/18* (2013.01); *B32B 27/32* (2013.01); *B32B 27/34* (2013.01); *B32B 27/36* (2013.01); *H04L 67/34* (2013.01); *B32B 2264/10* (2013.01); *B32B 2307/726* (2013.01);
(Continued)

(58) Field of Classification Search
CPC .. G06F 8/61; B32B 7/02; B32B 27/18; B32B 27/32; B32B 27/34; B32B 27/36; B32B 2264/10; B32B 2307/726; B32B 2409/00; B32B 2509/10; H04L 67/34;
(Continued)

(56) References Cited

U.S. PATENT DOCUMENTS 5,754,774 A 5/1998 Bittinger
5,960,204 A 9/1999 Yinger et al.
(Continued)

OTHER PUBLICATIONS

University of Oslo Department of Informatics—Service Discovery in Mobile Ad-hoc Networks—Joakim Flathagen, Nov. 1, 2008.
(Continued)

*Primary Examiner* — S. Sough
*Assistant Examiner* — Timothy P Duncan
(74) *Attorney, Agent, or Firm* — Womble Bond Dickinson (US) LLP

(57) ABSTRACT

A method and apparatus for dynamic retrieval of installation packages when installing software is described herein. In one embodiment, a process can be provided to determine a specific installation package to be installed for software having one or more packages to be installed. A repository can be automatically identified from a plurality of repositories from which to obtain the specific installation package, based on priority criteria. The priority criteria can be based on dynamically changing parameters. The specific installation package can be obtained from the identified repository.

20 Claims, 7 Drawing Sheets

Related U.S. Application Data continuation of application No. 12/768,658, filed on Apr. 27, 2010, now Pat. No. 8,707,296.

(51) Int. Cl.
| | | |
|---|---|---|
| *B32B 7/02* | (2019.01) | |
| *B32B 27/18* | (2006.01) | |
| *B32B 27/32* | (2006.01) | |
| *B32B 27/34* | (2006.01) | |
| *B32B 27/36* | (2006.01) | |

(52) U.S. Cl.
CPC ....... *B32B 2439/00* (2013.01); *B32B 2509/10* (2013.01); *Y10T 428/24* (2015.01); *Y10T 428/24372* (2015.01); *Y10T 428/269* (2015.01); *Y10T 428/31504* (2015.04); *Y10T 428/31855* (2015.04)

(58) Field of Classification Search
CPC ........... Y10T 428/24; Y10T 428/24372; Y10T 428/269; Y10T 428/31504; Y10T 428/31855
See application file for complete search history.

(56) References Cited

U.S. PATENT DOCUMENTS

| | | | |
|---|---|---|---|
| 6,038,601 A | 3/2000 | Lambert | |
| 6,202,206 B1 | 3/2001 | Dean | G06F 8/61 |
| | | | 717/177 |
| 6,226,784 B1 | 5/2001 | Holmes et al. | |
| 6,327,569 B1 | 12/2001 | Reep | 705/37 |
| 6,401,238 B1 | 6/2002 | Brown et al. | |
| 6,438,594 B1 | 8/2002 | Bowman-Amuah | |
| 6,505,243 B1 | 1/2003 | Lortz | |
| 6,671,259 B1 | 12/2003 | He et al. | |
| 6,735,741 B1 | 5/2004 | Pannu | |
| 6,757,706 B1 | 6/2004 | Dong | |
| 6,854,016 B1 | 2/2005 | Kraenzel | G06Q 10/06 |
| | | | 717/177 |
| 6,976,057 B2 | 12/2005 | Yoshiasa | |
| 6,986,134 B1 | 1/2006 | Foster | 717/177 |
| 7,165,250 B2 | 1/2007 | Lyons | |
| 7,246,140 B2 | 7/2007 | Therrien | G06F 11/1448 |
| 7,266,556 B1 | 9/2007 | Coates | |
| 7,426,578 B2 | 9/2008 | Jones et al. | |
| 7,461,374 B1 | 12/2008 | Balint et al. | |
| 7,581,217 B2 | 8/2009 | Jhanwar et al. | |
| 7,590,981 B2 | 9/2009 | Gupta | |
| 7,657,887 B2 | 2/2010 | Kothandaraman | H04L 67/06 |
| | | | 717/176 |
| 7,730,155 B1 | 6/2010 | Meyer et al. | |
| 7,730,159 B1 | 6/2010 | Meyer et al. | |
| 7,765,277 B1 | 7/2010 | Meyer et al. | |
| 7,774,774 B1 | 8/2010 | Mulligan et al. | |
| 8,108,770 B2 | 1/2012 | Chijiiwa et al. | |
| 8,146,077 B2 | 3/2012 | McNally | G06F 17/30905 |
| | | | 717/177 |
| 8,214,400 B2 | 7/2012 | Fachan et al. | 707/793 |
| 8,260,815 B2 | 9/2012 | Chang et al. | |
| 8,266,133 B2 | 9/2012 | Angelo et al. | |
| 8,290,811 B1 | 10/2012 | Robinson et al. | |
| 8,793,683 B2 | 7/2014 | DeHaan | G06F 8/60 |
| | | | 717/172 |
| 8,825,795 B2 | 9/2014 | Wesley, Sr. | G06F 17/30424 |
| | | | 717/172 |
| 8,869,138 B2 | 10/2014 | Bandakka | G06F 8/665 |
| | | | 717/172 |
| 8,997,086 B2 | 3/2015 | Deckert | G06F 8/61 |
| | | | 717/172 |
| 9,032,393 B1 | 5/2015 | Allen | G06F 8/68 |
| | | | 717/177 |
| 9,037,685 B2 | 5/2015 | Welingkar | G06F 17/30575 |
| | | | 717/176 |
| 2002/0140743 A1* | 10/2002 | DeLuca | H04L 41/22 |
| | | | 715/835 |
| 2002/0174264 A1 | 11/2002 | Fuller | G06F 9/4413 |
| | | | 717/176 |
| 2003/0088716 A1 | 5/2003 | Sanders | |
| 2003/0115202 A1 | 6/2003 | Jackson et al. | |
| 2003/0233455 A1 | 12/2003 | Leber et al. | |
| 2004/0068713 A1 | 4/2004 | Yannakoyorgos et al. | |
| 2004/0093361 A1 | 5/2004 | Therrien et al. | 707/204 |
| 2004/0193702 A1 | 9/2004 | Osborne et al. | |
| 2004/0221053 A1 | 11/2004 | Codeila et al. | |
| 2005/0044165 A1 | 2/2005 | O'Farrell et al. | |
| 2005/0071385 A1 | 3/2005 | Rao | |
| 2005/0132074 A1 | 6/2005 | Jones et al. | |
| 2006/0048142 A1 | 3/2006 | Roese | H04L 41/0893 |
| | | | 717/176 |
| 2006/0130045 A1 | 6/2006 | Wesley et al. | |
| 2006/0206450 A1 | 9/2006 | Fletcher | |
| 2006/0206587 A1 | 9/2006 | Fabbrocino | |
| 2007/0005568 A1 | 1/2007 | Angelo et al. | |
| 2007/0157195 A1 | 7/2007 | Gaa-Frost et al. | |
| 2007/0214454 A1 | 9/2007 | Edwards | G06F 17/3089 |
| | | | 717/176 |
| 2008/0130639 A1 | 6/2008 | Costa-Requena et al. | |
| 2008/0184221 A1 | 7/2008 | Rengarajan et al. | |
| 2008/0209410 A1 | 8/2008 | Demsky | |
| 2008/0307412 A1 | 12/2008 | Marr | G06F 17/30902 |
| | | | 717/177 |
| 2009/0070757 A1 | 3/2009 | Bak et al. | |
| 2009/0089775 A1 | 4/2009 | Zusman | |
| 2009/0241104 A1 | 9/2009 | Amiga et al. | |
| 2009/0260004 A1 | 10/2009 | Datta et al. | |
| 2009/0276770 A1 | 11/2009 | Taieb et al. | |
| 2010/0211942 A1 | 8/2010 | Deverakonda Venkata et al. | |
| 2011/0047413 A1 | 2/2011 | McGill | G06F 11/1662 |
| | | | 717/172 |

OTHER PUBLICATIONS

PCT International Search Report and Written Opinion of the International Searching Authority, PCT/US2011/032561 filed Apr. 14, 2011, dated Jun. 22, 2011, 13 pages.

PCT International Preliminary Report on Patentability, PCT/US2011/032561 filed Apr. 14, 2011, dated Oct. 30, 2012, 9 pages.

Bertino, "Modern Version Control Creating an Efficient Development Ecosystem"; 2012 ACM; [retrieved on Jun. 9, 2016]; Retrieved from Internet <URL:http://dl.acm.org/citation.cfm?id=2382510>; pp. 219-222.

Juan-Verdejo, Baars, "Decision Support for Partially Moving Applications to the Cloud—the Example of Business Intelligence"; 2013 ACM; [retrieved on Jun. 9, 2016]; Retrieved from Internet <URL:http://dl.acm.org/citation.cfm?id=2462316>; pp. 35-42.

Vitharana, et al., "Knowledge-based repository scheme for storing and retrieving business components: A theoretical design and an empirical analysis"; 2003 IEEE; [retrieved on Jun. 9, 2016]; Retrieved from Internet <URL:http://ieeexplore.ieee.org/stamp/stamp.jsp?tp=&arnumber=1214328>; pp. 649-664.

Korba, "Towards Secure Agent Distribution and Communication"; 1999, Canadian Crown; [retrieved on Jun. 9, 2016]; Retrieved from Internet <URL:http://ieeexplore.ieee.org/stamp/stamp.jsp?tp=&arnumber=773091>; pp. 1-10.

* cited by examiner

DYNAMIC RETRIEVAL OF INSTALLATION PACKAGES WHEN INSTALLING SOFTWARE

This application is a continuation of co-pending U.S. application Ser. No. 14/178,091 filed on Feb. 11, 2014, which is a continuation of U.S. application Ser. No. 12/768,658, filed on Apr. 27, 2010, now issued as U.S. Pat. No. 8,707,296.

FIELD OF THE INVENTION

The field of invention relates generally to computing systems, and, more specifically, to dynamic retrieval of installation packages when installing software.

BACKGROUND

Software may be installed from a repository. There may be several repositories available from which the software can be installed. The software may be obtained faster from some repositories than others.

SUMMARY OF THE DESCRIPTION

Mechanisms for dynamical retrieval of installation packages when installing software are described herein. In one embodiment, a process can be provided to determine a specific installation package to be installed from one or more installation packages of software. An identification of a repository may be made from a plurality of repositories, based on priority criteria. The priority criteria may be based on dynamically changing parameters. The specific installation package may be obtained from the identified repository. Systems, methods, and machine readable storage media which perform or implement one or more embodiments are also described.

Other features of the present invention will be apparent from the accompanying drawings and from the detailed description which follows.

BRIEF DESCRIPTION OF THE DRAWINGS

The present invention is illustrated by way of example and not limited in the figures of the accompanying drawings, in which like references indicate similar elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Software to be installed on a system can include multiple packages. These packages may exist in different repositories (e.g., local hard drive, local optical disk, through a local area network, remote servers, etc.). A computing system may determine a specific package needed in order to install the software. If the specific package exists in multiple repositories, the computing system may determine which repository to obtain the specific package from. The determination may be made based on priority criteria. In one embodiment, the priority criteria can be based on dynamically changing parameters. In one embodiment, the priority criteria indicate the fastest repository from which to obtain the specific package.

In one embodiment, information about the dynamically changing parameters can be received from other computing systems.

In one embodiment, if the specific package cannot be obtained from a determined repository, an alternate repository can be determined from which to obtain the specific package.

In one embodiment, a determination can be made if an updated version of the specific package exists. If an updated version of the specific package exists, the required version of the specific package may be updated prior to identifying a repository from which to obtain the specific package.

Figure 1:
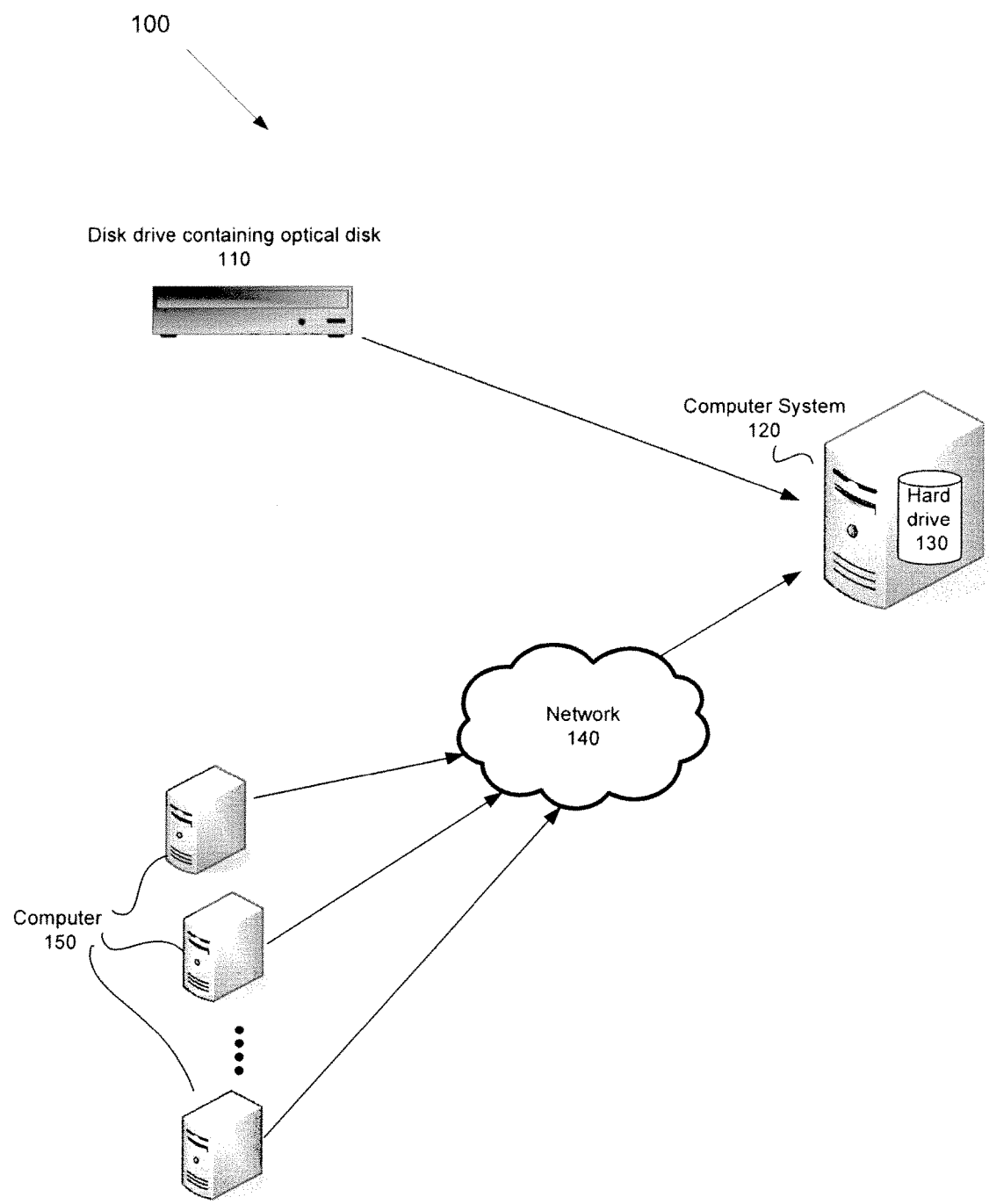
FIG. 1 illustrates an exemplary system architecture including an optical disk drive and one or more computers and computer systems connected over a network in which embodiments of the present invention may operate.

FIG. 1 illustrates a system architecture 100 in which dynamical retrieval of installation packages may be performed. System architecture 100 may include disk drive 110, computer system 120 and one or more computers 150. Computer system 120 may communicate with one or more computers 150 via network 140. Computers 150 may contain repositories (e.g., hard drives) from which installation packages may be retrieved. Disk drive 110 may contain an optical disk as a repository from which an installation package may be retrieved. Computer system 120 may contain hard drive 130. Hard drive 130 may be a repository from which an installation package may be retrieved.

In one embodiment, network 140 may be a public network (e.g., Internet) or a private network (e.g., local area network (LAN)). In one embodiment, computers 150 may include a broadcast server which broadcasts the availability of an installation package over network 140. Computer system 120 may determine whether the installation package needs to be installed and may then further determine whether to download the installation package from the broadcast server computer 150 over network 140. In one embodiment, computers 150 may transmit information related to dynamically changing parameters to computer system 120 over network 140.

In one embodiment of the present invention, disk drive 110 can communicate with computer system 120 in any number of protocols. For example, disk drive 110 can be an internal disk drive for computer system 120, connected via an Advanced Technology Attachment (ATA) or Serial Advanced Technology Attachment (SATA) interface. In an alternate embodiment of the present invention, disk drive 110 is connected to computer system 120 via a Universal Serial Bus (USB), a IEEE 1394 interface such as FireWire™ available from Apple, Inc. of Cupertino, Calif., or a Small Computer System Interface (SCSI). In yet another embodiment of the present invention, disk drive 110 communicates with computer system 120 via one or more networks. The networks may include a LAN, WAN, intranet, extranet, wireless network, the Internet, etc. In one embodiment, computer system 120 may be able to determine information about dynamically changing parameters related to disk drive 110.

In one embodiment, hard drive 130 is a local hard drive located within computer system 120. In one embodiment, computer system 120 may be able to determine information about dynamically changing parameters related to hard drive 130.

Figure 2:
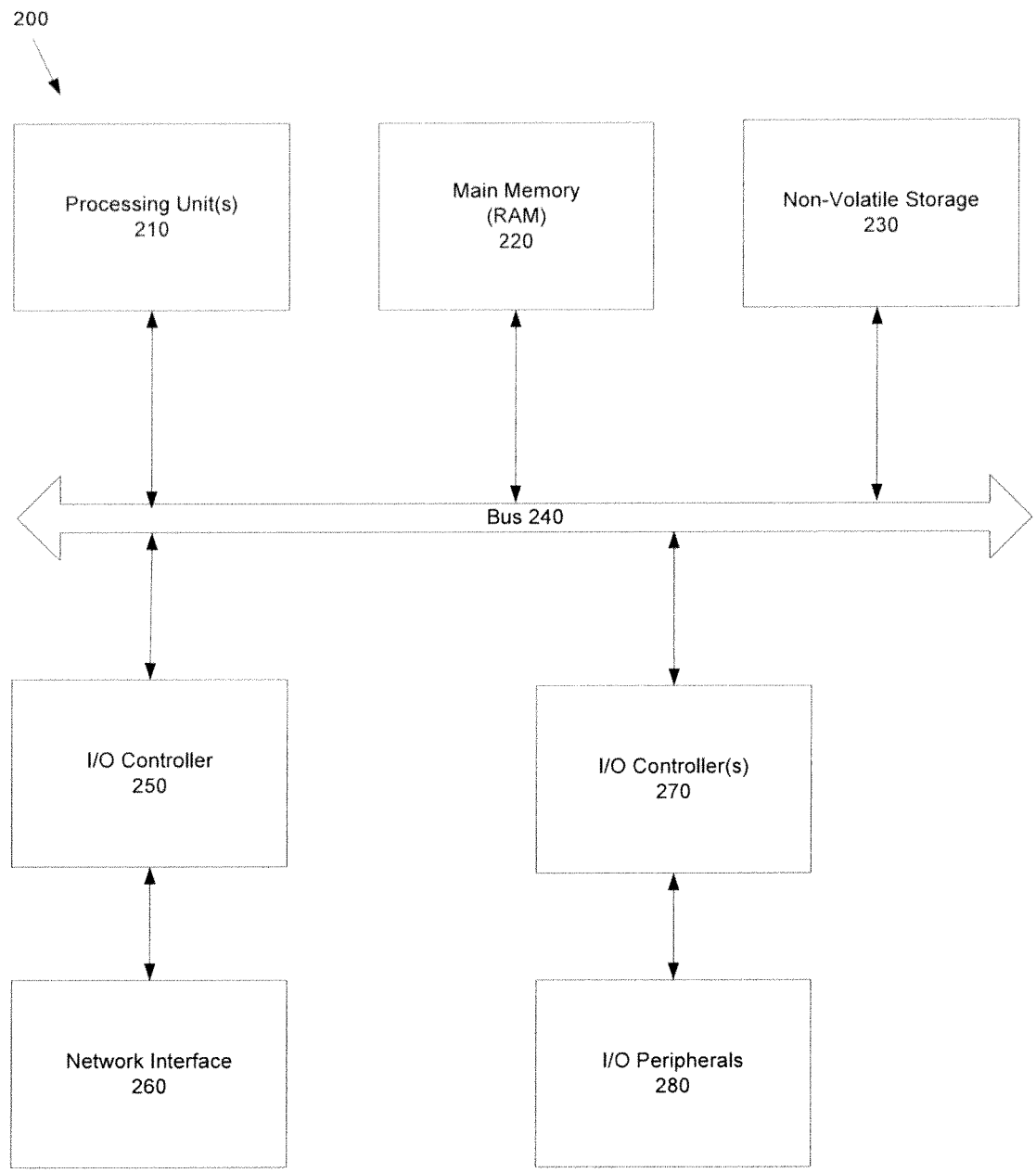
FIG. 2 illustrates a block diagram of an exemplary computer system in which embodiments of the present invention may operate.

FIG. 2 is a block diagram of an exemplary computer system in which embodiments of the present invention may operate. Computer system 200 includes processing unit(s) 210, main memory (RAM) 220, non-volatile storage 230, bus 240, I/O controller 250, network interface 260, I/O controller 270, and I/O peripherals 280.

Main memory 220 encompasses all volatile or non-volatile storage media, such as dynamic random access memory (DRAM), static RAM (SRAM), or flash memory. Main memory 220 includes storage locations that are addressable by the processing unit(s) 210 for storing computer program code and data structures for dynamic retrieval of installation packages when installing software. Such computer program code and data structures also may be stored in non-volatile storage 230. Non-volatile storage 230 includes all non-volatile storage media, such as any type of disk including floppy disks, optical disks such as CDs, DVDs and BDs (Blu-ray Disks), and magnetic-optical disks, magnetic or optical cards, or any type of media, and may be loaded onto the main memory 220. Those skilled in the art will immediately recognize that the term "computer-readable storage medium" or "machine readable storage medium" includes any type of volatile or non-volatile storage device that is accessible by a processor (including main memory 220 and non-volatile storage 230).

Processing unit(s) 210 is coupled to main memory 220 and non-volatile storage 230 through bus 240. Processing unit(s) 210 includes processing elements and/or logic circuitry configured to execute the computer program code and manipulate the data structures. It will be apparent to those skilled in the art that other processing and memory means, including various computer readable storage media, may be used for storing and executing computer program code pertaining to dynamic retrieval of installation packages when installing software.

Processing unit(s) 210 can retrieve instructions from main memory 220 and non-volatile storage 230 via bus 240 and execute the instructions to perform operations described below. Bus 240 is coupled to I/O controller 250. I/O controller 250 is also coupled to network interface 260. Network interface 260 can connect to a network to download software from a repository existing on the network, to receive information about dynamically changing parameters for repositories existing on the network, and to receive broadcast information from broadcast servers on the network regarding software which can be downloaded over the network.

Bus 240 is further coupled to I/O controller(s) 270. I/O controller(s) 270 are coupled to I/O peripherals 280, which may be mice, keyboards, modems, disk drives, printers and other devices which are well known in the art. I/O peripherals 280 can further include an optical drive which contains the optical disk with the software to be installed on computer system 200.

Figure 3:
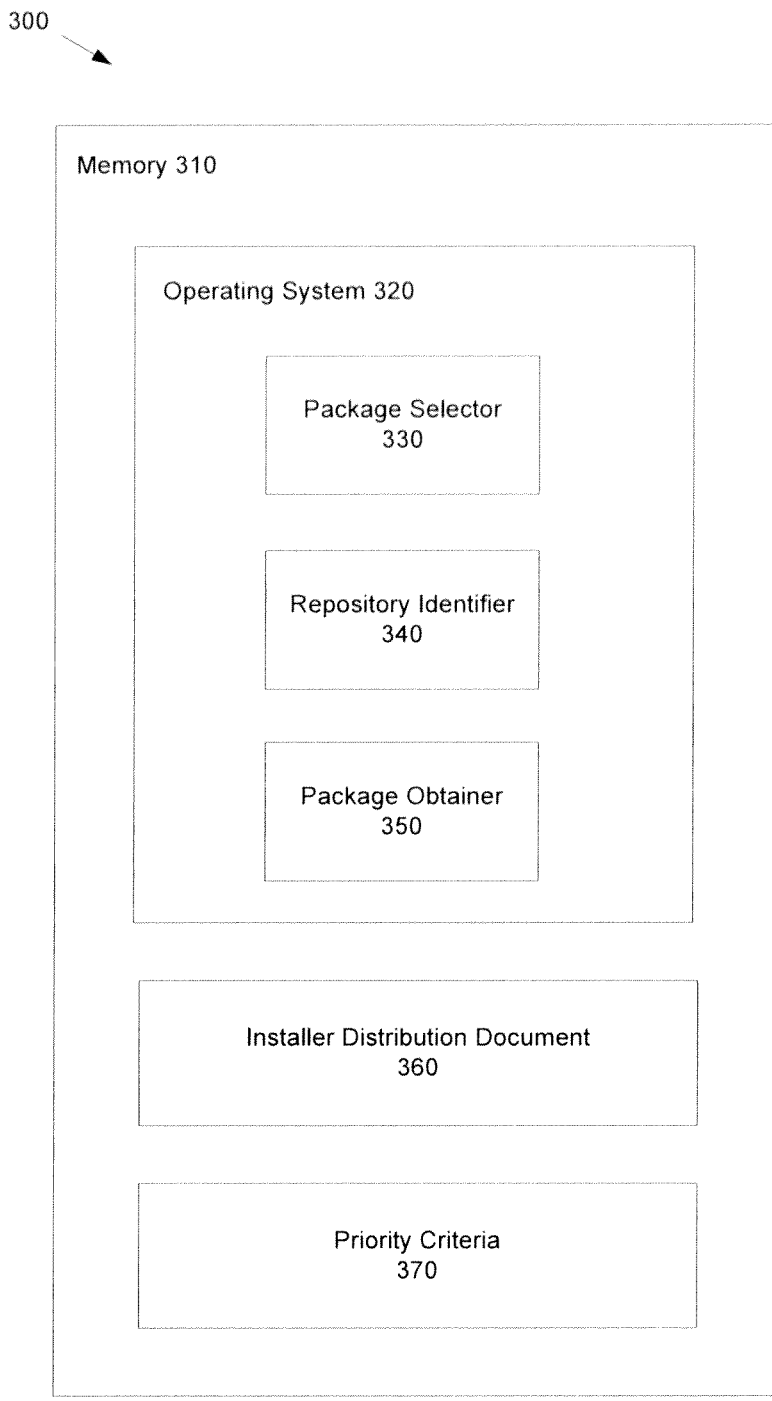
FIG. 3 illustrates an exemplary memory in accordance with one embodiment of the present invention.

FIG. 3 illustrates an exemplary main memory 220 of FIG. 2 in accordance with one embodiment of the present invention. Referring to FIG. 3, memory 310 contains operating system 320, installer distribution document 360, and priority criteria 370. Within operating system 320, there is package selector 330, repository identifier 340, and package obtainer 350. In other embodiments, the software components 330, 340, and 350 can be separate from and not part of an operating system. Although memory 310 has been shown as a single memory, this is just one illustrative embodiment. In alternate embodiments, memory 310 can be split into more than one memory.

In one embodiment, software to be installed may be made up of one or more installation packages. As used herein, the term "software" can be used in the singular or plural form. In one embodiment, the installation packages can contain the software to be installed on a system. In one embodiment, files can contain the software and these files may be compressed in the installation packages. In one embodiment, the installation packages can contain metainfo. In this embodiment, the metainfo can track the software to be installed and may also track the software that has already been installed. In one embodiment, each installation package may contain package information, which can describe the contents of the installation package. In one embodiment, the contents of the installation package can contain a payload, which can be the compressed representation of all software files to be installed. In one embodiment, the software can be an operating system. Package selector 330 can determine a specific installation package to install on the computing system. In one embodiment, package selector 330 can determine the installation package based on an installer distribution document for the software. The installer distribution document can include an identifier for each of the installation packages required for the software to be installed and can include a location from which to determine whether an updated version of the installation packages exist. In one embodiment, the installer distribution document can be installer distribution document 360. In an alternate embodiment, package selector 330 can obtain the installer distribution document from operating system 320. In yet another alternate embodiment, package selector 330 can obtain the installer distribution document from an installation media accessible to the computing system. In yet another alternate embodiment, package selector 330 can obtain the installer distribution document from another computing system over a network. In yet another alternate embodiment, package selector 330 can obtain information about the installation package from a broadcast server and may not access an installer distribution document.

In one embodiment, package selector 330 may determine whether an updated version of the installer distribution document exists and update the version of the installer distribution document prior to selecting a specific installation package to install. In an alternate embodiment, package selector 330 may determine whether an updated version of the specific installation package is available. If package selector 330 determines a newer version of the specific installation package is available, package selector 330 may update the version of the specific installation package to be obtained. Once the package selector 330 has determined a specific installation package to be obtained, package selector 330 may send a notification to repository identifier 340.

Repository identifier 340 can identify a repository from which to obtain a specific installation package. In one embodiment, multiple repositories exist which are accessible to repository identifier 340. In one embodiment, these repositories can include a local disk, an optical drive, optical drives or disks located on one or more computers accessible over a network, and remote servers. In one embodiment, repository identifier 340 can identify a repository from which to obtain a specific installation package based on priority criteria 370. In one embodiment, priority criteria 370 are used by repository identifier 340 to determine the fastest repository from which to obtain the specific package.

In one embodiment, priority criteria 370 can be pre-defined and can list an order in which to access the repositories. In this embodiment, for example, priority criteria 370 may cause repository identifier 340 to access the local hard drive first, the local optical disk second, a computer accessible over local area network third, and a remote server last. In alternate embodiments, priority criteria 370 may include alternate pre-defined orders for accessing of repositories. In another alternate embodiment, priority criteria 370 can be dynamic and may be based on dynamically changing parameters. In one embodiment, the dynamically changing parameters may include network throughput, the speed of a device such as an optical drive or disk, and the speed of a server. In one embodiment, repository identifier 340 can receive information regarding the dynamically changing parameters prior to identifying a repository. In one embodiment, the information regarding the dynamically changing parameters is stored in priority criteria 370.

In one embodiment, prior to identifying a repository, repository identifier 340 may determine whether an updated version of the specific installation package is available. If repository identifier 340 determines a newer version of the specific installation package is available, repository identifier 340 may update the version of the specific installation. Repository identifier 340 may then identify a repository from which to obtain the updated version of the specific installation package based on priority criteria 370. Repository identifier 340 may then send a completion notice to package obtainer 350 that the specific installation package can be obtained from the identified repository.

Upon receiving a completion notice from repository identifier 340, package obtainer 350 can obtain the specific installation package from the identified repository. In an alternate embodiment, no completion notice is sent from repository identifier 340. In this embodiment, package obtainer 350 can obtain the specific installation package from the identified repository without waiting for the completion notice. In certain embodiments, package obtainer 350 can be optional if the priority software is already installed on the system and does not need to be updated or overwritten.

Figure 4:
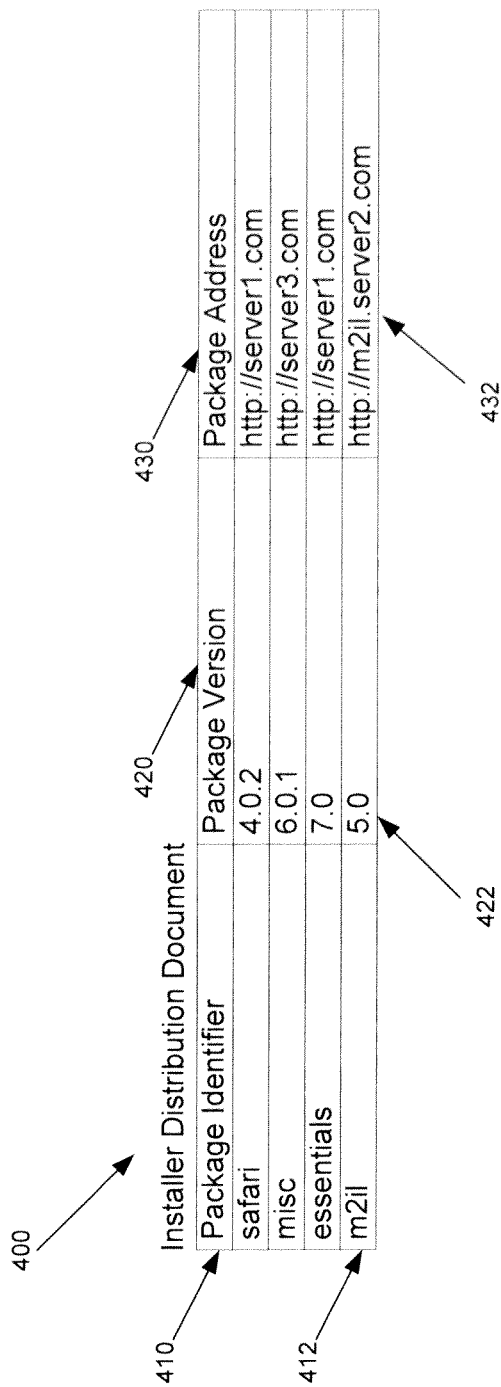
FIG. 4 illustrates an exemplary installer distribution document in accordance with embodiments of the present invention.

FIG. 4 illustrates an exemplary installer distribution document 400 in accordance with one embodiment of the present invention. Installer distribution document 400 may be obtained from a local disk, an optical drive, from another system over a network, or from a remote server.

Referring to FIG. 4, installer distribution document 400 can contain a package identifier 410 for each of the installation packages required for software to be installed on the system. Each package identifier 410 can contain a corresponding package version 420 and a corresponding package address 430. Package version 420 can correspond to which version of the package should be obtained from the repository. In one embodiment, package version 420 may be updated for a package when the system checks whether a newer version of the package exists. In one embodiment, package address 430 can specify the location to check in order to determine whether an updated version of the package exists. In one embodiment, package address 430 can specify the location to check in order to determine whether an updated installer distribution document 400 exists. In one embodiment, package address 430 can be a hard coded uniform resource locator (URL). In an alternate embodiment, package address 430 can be a generic URL for a server. For example, in one embodiment, installer distribution document 400 can require an installation package "m2il" (412) to be installed. The version for m2il (412) to be installed is version 5.0 (422). The server at package address "http://m2il.server2.com" (432) can be used to determine if there is a later version of the package than version 5.0.

Figure 5:
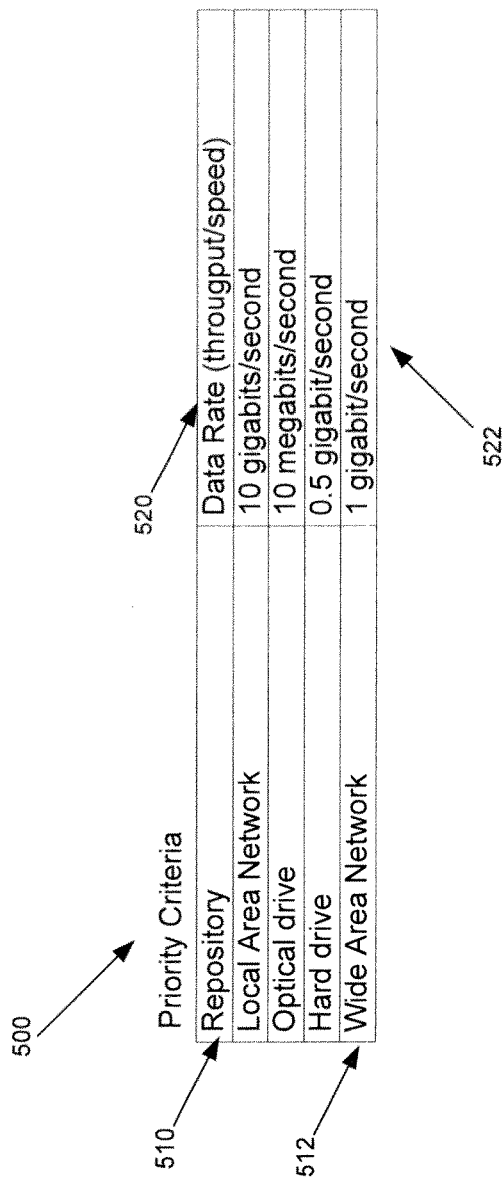
FIG. 5 illustrates an exemplary priority criteria in accordance with embodiments of the present invention.

FIG. 5 illustrates an exemplary priority criteria 500 in accordance with one embodiment of the present invention.

Referring to FIG. 5, priority criteria 500 can contain a list of repositories 510 accessible to the system. Each repository 510 can contain a corresponding data rate 520. For example, wide area network 512 contains a data rate of 1 gigabit/second. In one embodiment, based on priority criteria 500, a system can determine which repository 510 has the best data rate 520 and therefore, which repository 510 the system should use to obtain a specific installation package. In one embodiment, the repositories listed in priority criteria 500 can send updated information regarding their corresponding data rates to the system. This updated information can be stored in priority criteria 500.

Figure 6:
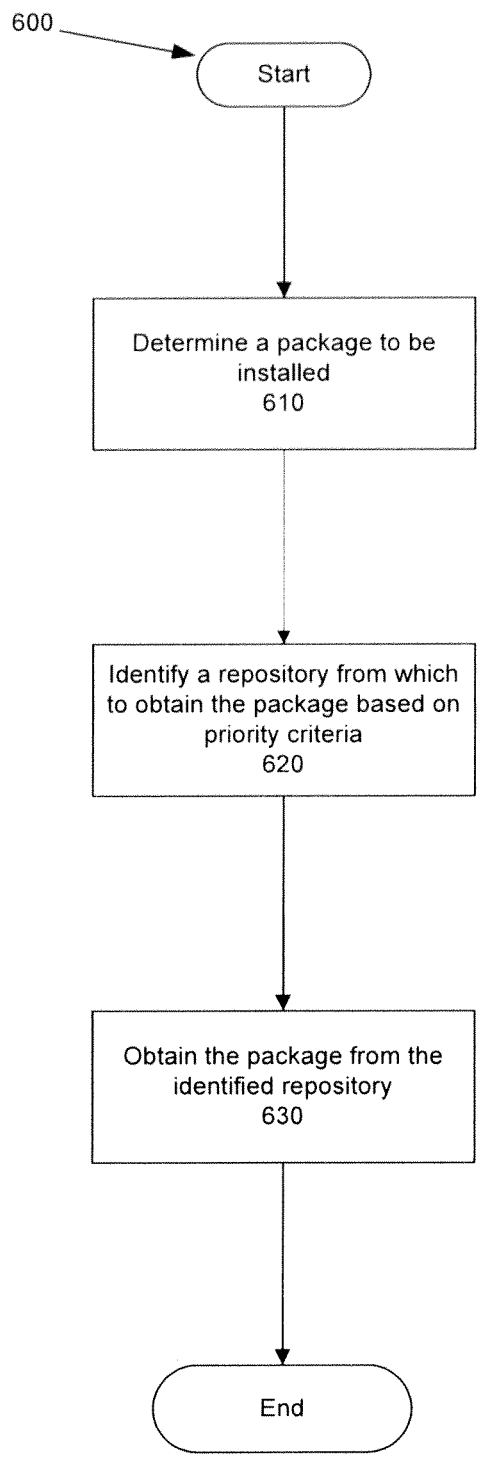
FIG. 6 illustrates a flow diagram of a method of dynamic retrieval of installation packages when installing software in accordance with embodiments of the present invention.

FIG. 6 illustrates a flow diagram of a method of dynamic retrieval of installation packages when installing software in accordance with embodiments of the present invention. In one embodiment, dynamic retrieval of installation packages method 600 is performed by package selector 330, repository identifier 340, and package obtainer 350.

Referring to FIG. 6, method 600 starts at block 610. At block 610, the process determines a package to be installed. In one embodiment, software to be installed may be made up of one or more packages. In one embodiment, files can contain the software and these files may be compressed in the packages. In one embodiment, the packages can contain metainfo. In this embodiment, the metainfo can track the software to be installed and may also track the software that has already been installed. In one embodiment, each package may contain package information, which can describe the contents of the package. In one embodiment, the contents of the package can contain a payload, which can be the compressed representation of all software files to be installed. In one embodiment, the software can be an operating system. In one embodiment, block 610 can determine the package based on an installer distribution document for the software. The installer distribution document can include an identifier for each of the installation packages required for the software to be installed and a location to check in order to determine whether an updated version of the installation packages exist. In one embodiment, the installer distribution document can be located in a memory of the computer system on which the software is to be installed. In an alternate embodiment, the installer distribution document can be located in the operating system of the computer system. In yet another alternate embodiment the installer distribution document can be obtained from an installation media. In yet another alternate embodiment, the installer distribution document can be obtained from another system over a network. In yet another alternate embodiment, block 610 can determine the package based on information received from a broadcast server regarding the availability of the package, and may not access an installer distribution document.

In one embodiment, block 610 may determine whether an updated version of the installer distribution document exists and update the version of the installer distribution document prior to selecting a specific installation package to install. In an alternate embodiment, block 610 may determine whether an updated version of the specific installation package is available based on the information in the installer distribution document. If a newer version of the specific installation package is available, the version of the specific installation package to be obtained may be updated. The process then proceeds to block 620.

At block 620, a repository is identified from which to obtain the specific installation package. In one embodiment, the identification can be made based on priority criteria. In one embodiment, multiple repositories exist from which the package can be obtained. In certain embodiments, these repositories can include a local disk, an optical drive, optical drives or disks located on one or more computers accessible over a network (LAN, WAN, Internet, etc.), or a remote server.

In one embodiment, the priority criteria can be predefined and can list an order in which to access the multiple repositories. In this embodiment, for example, the priority criteria may identify the local hard drive first, the local optical disk second, a computer accessible over local area network third, and a remote server last. In alternate embodiments, the priority criteria may include alternate pre-defined orders for accessing of repositories. In yet another alternate embodiment, the priority criteria can be dynamic and may be based on dynamically changing parameters. In one embodiment, the dynamically changing parameters may include data rates for each of the multiple repositories (e.g., network throughput, the speed of a device such as an optical drive or disk, and the speed of a server). In one embodiment, information regarding the dynamically changing parameters may be received from the available repositories prior to identifying a repository. In one embodiment, the repository with the highest data rate (fastest) is identified as the repository from which to obtain the package from.

In one embodiment, prior to identifying a repository, block 620 may determine whether an updated version of the specific installation package is available. If an updated version of the specific installation package is available, the version of the specific installation package may be updated. Block 620 may then identify a repository from which to obtain the updated version of the specific installation package based on the priority criteria. The process then proceeds to block 630.

At block 630, the specific installation package is obtained from the identified repository. In one embodiment, if the identified repository is accessible over a network, the installation package can be obtained by downloading the package over the network. In one embodiment, if there is a problem with the identified repository and the package cannot be obtained from the identified repository (e.g., bad disk in optical drive, network is unavailable, hard drive fails, etc.), the process can return to block 620 to determine an alternate repository from which to obtain the package. In certain embodiments, once a repository is identified for a package, the identified repository can be used for obtaining all the packages corresponding to the software to be installed on the system (as may be listed in the installation distribution document) and available from the identified repository, unless a problem arises with respect to the identified repository.

In certain embodiments, blocks 620 and 630 are optional and are not performed if the appropriate version of the identified package is installed on the system and does not need to be updated or overwritten. In certain embodiments, if blocks 620 and 630 are omitted, the process ends from block 610.

Method 600 illustrates one implementation of dynamic retrieval of installation packages when installing software. In alternate embodiments, the order in which the blocks of method 600 are performed can be modified without departing from the scope of the invention.

Figure 7:
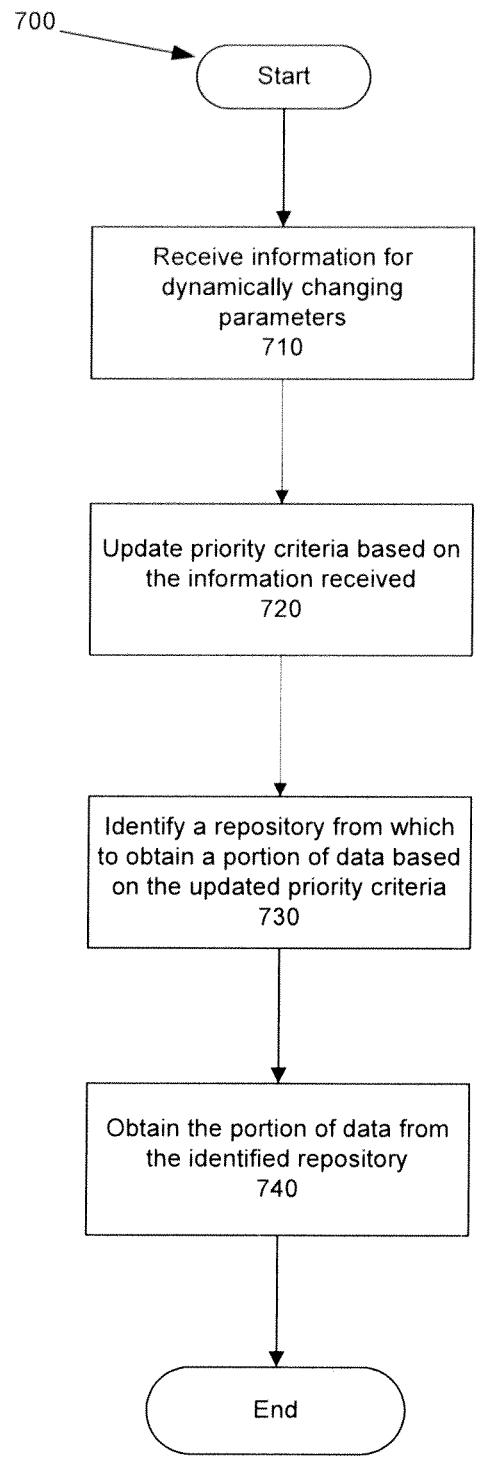
FIG. 7 illustrates a flow diagram of a method of dynamic retrieval of installation packages when installing software in accordance with embodiments of the present invention.

FIG. 7 illustrates a flow diagram of a method of dynamic retrieval of installation packages when installing software in accordance with embodiments of the present invention. In one embodiment, dynamic retrieval of installation packages method 700 is performed by package selector 330, repository identifier 340, and package obtainer 350.

Referring to FIG. 7, block 710 receives information for dynamically changing parameters. In one embodiment, the dynamically changing parameters may include data rates (e.g., network throughput, the speed of a device such as an optical drive or disk, and the speed of a server) for multiple repositories available to a computer system. In one embodiment, the multiple repositories may include a local disk, an optical drive, and optical drives or disks located on one or more computers accessible over a network (LAN, WAN, Internet, etc.), or a remote server. The process then proceeds to block 720.

At block 720, the process updates priority criteria for the repositories based on the information received. In one embodiment, the priority criteria can be determined based on the data rates for the repositories received. In one embodiment, the repository with the highest data rate can be the repository with the highest priority. In one embodiment, the data rates for the repositories can be used to determine the fastest repository from which to obtain data. The process proceeds to block 730.

At block 730, a repository is identified from which to obtain an updated portion of data based on the updated priority criteria. In one embodiment, the repository with the fastest data rate can be the repository with the highest priority, and therefore can be identified as the repository from which to obtain the package from. The process then proceeds to block 740.

At block 740, the portion of data is obtained from the identified repository. In one embodiment, if the identified repository is accessible over a network, the installation package can be obtained by downloading the package over the network. In one embodiment, if there is a problem with the identified repository and the portion of data cannot be obtained from the identified repository (e.g., bad disk in optical drive, network is unavailable, hard drive fails, etc.), the process can return to block 730 to determine an alternate repository from which to obtain the portion of data. In certain embodiments, once a repository is identified for a portion of data, the identified repository can be used for obtaining all data available from the identified repository for the system unless a problem arises with respect to the identified repository.

In certain embodiments, blocks 730 and 740 are optional and are not performed if the portion of data is located on the system and does not need to be updated or overwritten. In certain embodiments, if blocks 730 and 740 are omitted, the process ends from block 720.

Method 700 illustrates one implementation of dynamic retrieval of installation packages when installing software. In alternate embodiments, the order in which the blocks of method 700 are performed can be modified without departing from the scope of the invention.

The methods as described herein are not described with reference to any particular programming language. It will be appreciated that a variety of programming languages may be used to implement the teachings of the present invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be further appreciated that more or fewer processes may be incorporated into the methods 600 and 700 in FIG. 6 and FIG. 7 respectively without departing from the scope of the invention and that no particular order is implied by the arrangement of blocks shown and described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A machine-implemented method for installing software, the method comprising:
   receiving, through a network interface of a computing system, information from a broadcast server about availability of one or more installation packages for software;
   determining, from the information received from the broadcast server, a specific installation package to be installed, the software having one or more installation packages to be installed;
   receiving information about data rates of each of a plurality of repositories;
   automatically identifying a repository from the plurality of repositories from which to obtain the specific installation package, wherein the identification is based on priority criteria, and wherein the priority criteria is based on dynamically changing parameters which include the data rates of the plurality of repositories;
   obtaining the specific installation package from the identified repository; and
   installing the specific installation package after obtaining the specific installation package.

2. The method of claim 1, further comprising:
   receiving, through the network interface, an installer distribution document.

3. The method of claim 1, further comprising:
   responsive to an unsuccessful obtaining of the specific installation package, identifying an alternate repository from which to obtain the specific installation package.

4. The method of claim 1, wherein the plurality of repositories comprises a plurality of servers.

5. The method of claim 1, wherein the dynamically changing parameters include a network throughput.

6. The method of claim 1, further comprising:
   dynamically determining whether an updated version of the specific installation package exists.

7. The method of claim 1 wherein the specific installation package includes compressed software.

8. The method of claim 1, further comprising:
   receiving, through the network interface, an installer distribution document.

9. The method of claim 8, wherein the plurality of repositories comprises a plurality of servers.

10. The method of claim 9, wherein the dynamically changing parameters include a network throughput, and wherein the installer distribution document includes a package identifier for a corresponding installation package.

11. A non-transitory computer-readable storage medium comprising executable instructions to cause a computing system to perform a method comprising:
   receiving, through a network interface of the computing system, information from a broadcast server about availability of one or more installation packages for software;
   determining, from the information received from the broadcast server, a specific installation package to be installed, the software having one or more installation packages to be installed;
   receiving information about data rates of each of a plurality of repositories;
   automatically identifying a repository from the plurality of repositories from which to obtain the specific installation package, wherein the identification is based on priority criteria, and wherein the priority criteria is based on dynamically changing parameters which include the data rates of the plurality of repositories;
   obtaining the specific installation package from the identified repository; and
   installing the specific installation package after obtaining the specific installation package.

12. The computer-readable storage medium of claim 11, wherein the method further comprises:
   receiving, through the network interface, an installer distribution document.

13. The computer-readable storage medium of claim 11, wherein the method further comprises:
   responsive to an unsuccessful obtaining of the specific installation package, identifying an alternate repository from which to obtain the specific installation package.

14. The computer-readable storage medium of claim 11, wherein the plurality of repositories comprises a plurality of servers.

15. The computer-readable storage medium of claim 11, wherein the dynamically changing parameters include a network throughput.

16. The computer-readable storage medium of claim 11, wherein the method further comprises:
   dynamically determining whether an updated version of the specific installation package exists.

17. The computer-readable storage medium of claim 11 wherein the specific installation package includes compressed software.

18. The computer-readable storage medium of claim 11, wherein the method further comprises:
   receiving, through the network interface, an installer distribution document.

19. The computer-readable storage medium of claim 18, wherein the plurality of repositories comprises a plurality of servers.

20. The computer-readable storage medium of claim 19, wherein the dynamically changing parameters include a network throughput, and wherein the installer distribution document includes a package identifier for a corresponding installation package.

* * * * *